US008350181B2

(12) United States Patent
Albanese et al.

(10) Patent No.: US 8,350,181 B2
(45) Date of Patent: Jan. 8, 2013

(54) GAS DISTRIBUTION RING ASSEMBLY FOR PLASMA SPRAY SYSTEM

(75) Inventors: Joseph Garfield Albanese, Rotterdam Junction, NY (US); Donald Joseph Baldwin, Galway, NY (US); Yuk-chiu Lau, Ballston Lake, NY (US); Christopher Joseph Lochner, Albany, NY (US); William Patrick Rusch, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 635 days.

(21) Appl. No.: 12/546,226

(22) Filed: Aug. 24, 2009

(65) Prior Publication Data

US 2011/0042358 A1 Feb. 24, 2011

(51) Int. Cl.
*B23K 10/00* (2006.01)

(52) U.S. Cl. .......... 219/121.45; 219/121.51; 219/121.52

(58) Field of Classification Search ............... 219/121.5, 219/0.45–0.52, 0.59, 75, 76.16
See application file for complete search history.

(56) References Cited

U.S. PATENT DOCUMENTS 3,823,302 A * 7/1974 Muehlberger ........... 219/121.47
3,851,140 A * 11/1974 Coucher .................. 219/121.59
4,649,257 A * 3/1987 Yakovlevitch et al. .... 219/121.5
4,967,055 A * 10/1990 Raney et al. ............... 219/121.5
5,408,066 A 4/1995 Trapani et al.
5,444,209 A * 8/1995 Crawmer et al. ........ 219/121.52
6,169,264 B1 * 1/2001 Marhic ...................... 219/121.5
6,963,044 B2 * 11/2005 Fusaro et al. ............ 219/121.46
7,557,324 B2 * 7/2009 Nylen et al. ............. 219/121.47
7,671,294 B2 * 3/2010 Belashchenko et al. . 219/121.51
7,928,338 B2 * 4/2011 Suslov ..................... 219/121.47
2005/0077272 A1 * 4/2005 Fusaro et al. ............ 219/121.45
2010/0196625 A1 * 8/2010 Yoon et al. .................... 427/569

FOREIGN PATENT DOCUMENTS

DE 102007041328 A1 3/2009
EP 0 961 527 A1 12/1999

OTHER PUBLICATIONS

Willi Schork, European Search Report and Written Opinion, Application No. EP 10 17 3262, Completion Date Aug. 30, 2011, 6 pages.

* cited by examiner

*Primary Examiner* — Michael Lebentritt
(74) *Attorney, Agent, or Firm* — Hoffman Warnick LLC; Ernest G. Cusick

(57) ABSTRACT

A gas distribution ring assembly for a plasma spray system includes a gas distribution ring including a plurality of openings allowing a gas to pass to an inner diameter thereof. The assembly also includes a separate positioning ring axially aligned with the gas distribution ring between the gas distribution ring and an electrically charged outlet of the plasma spray system.

18 Claims, 7 Drawing Sheets

GAS DISTRIBUTION RING ASSEMBLY FOR PLASMA SPRAY SYSTEM

BACKGROUND

1. Technical Field

The disclosure relates generally to plasma spray systems, and more particularly, to a two part gas distribution ring assembly for a plasma spray system.

2. Background Art

Plasma spray systems are used in a number of industrial settings such as direct current (DC) plasma torches. In these plasma spray systems, a ceramic gas distribution ring is used to direct the plasma gas into the cathode/anode region through a series of small holes drilled onto the body of the gas ring. The gas distribution ring also electrically separates the cathode and anode.

BRIEF SUMMARY

A first aspect of the disclosure provides a gas distribution ring assembly for a plasma spray system, the ring assembly comprising: a gas distribution ring including a plurality of openings allowing a gas to pass to an inner diameter thereof; and a separate positioning ring axially aligned with the gas distribution ring between the gas distribution ring and an electrically charged outlet of the plasma spray system.

A second aspect of the disclosure provides a plasma spray system comprising: an outlet that includes a cathode and an anode; an insulator member for electrically insulating the cathode from the anode; a gas distribution ring assembly comprising: a gas distribution ring for delivering a gas to the outlet, the gas distribution ring including a plurality of openings allowing a gas to pass to an inner diameter thereof; and a separate positioning ring axially aligned with the gas distribution ring between the gas distribution ring and the outlet; and a gas inlet for delivering the gas to the gas distribution ring.

A third aspect of the disclosure provides a plasma spray system comprising: a nozzle assembly including a cathode and an anode; a voltage generator including a first electrical input to the cathode and a second electrical input to the anode; an insulator member electrically insulating the cathode from the anode; a gas distribution ring assembly comprising: a gas distribution ring for delivering a gas to the nozzle assembly, the gas distribution ring including a plurality of openings allowing a gas to pass to an inner diameter thereof; and a separate positioning ring axially aligned with the gas distribution ring between the gas distribution ring and the anode, the positioning ring including an end face that is positioned in contact with an end face of the gas distribution ring; and a source of gas coupled to a gas inlet for delivery of the gas to the gas distribution ring.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
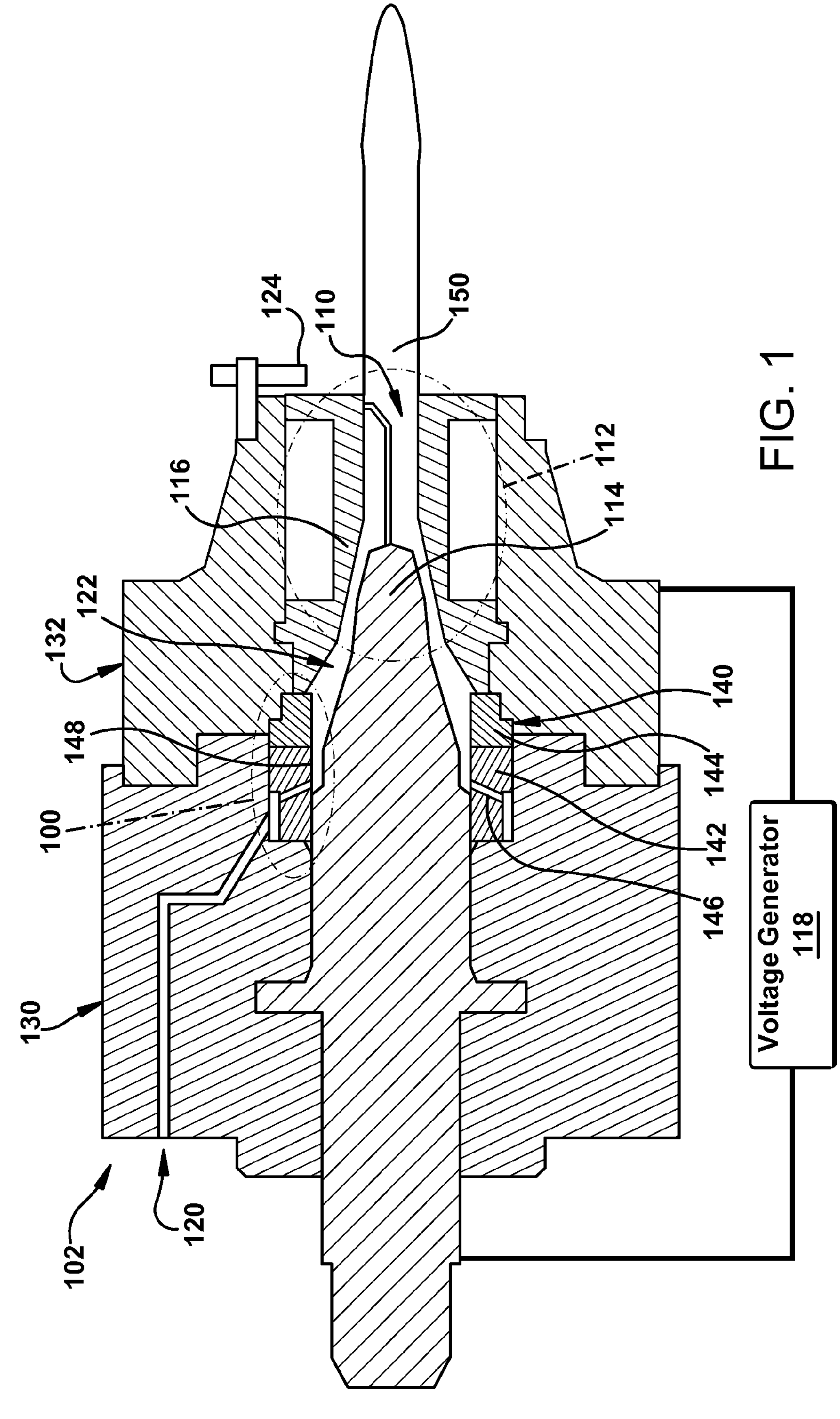
FIG. 1 shows a cross-sectional view of a plasma spray system including a gas distribution ring assembly according to embodiments of the invention.

Referring to the drawings, a gas distribution ring assembly 100 for a plasma spray system 102 is provided. As illustrated in FIG. 1, the teachings of the invention can be applied to a Sulzer Metco 03CX model plasma spray gun system, available from Sulzer Metco of Westbury, N.Y. It is emphasized, however, that the teachings of the various embodiments of the invention are applicable to a wide variety of plasma spray systems.

Plasma spray system 102 includes an outlet 110 that includes a nozzle assembly 112 that includes a cathode 114 and an anode 116. Cathode 114 and anode 116 are electrically powered by a voltage generator 118 including a first electrical input to cathode 114 and a second electrical input to anode 116 through a metallic housing 132. As understood, the electrical current causes a plasma plume to form from a plasma gas provided through a gas inlet 120. As the plasma exits outlet 110, a material to be applied is delivered outside of the outlet by a nozzle 124. It is understood that nozzle assembly 112 does not necessarily need to include cathode 114 and anode 116 in all instances as the nozzle can, in some instances, be positioned downstream of cathode 114 and anode 116. In addition, as understood, the position of cathode 114 and anode 116 can be switched in some instances. Cathode 114 and anode 116 each include a conductive material such as copper.

Plasma spray system 102 also includes an insulator member 130 electrically insulating cathode 114 from anode 116. Although shown as a single part, insulator member 130 may include a number of electrically insulative elements. Insulation member 130 may include any electrically insulative material, e.g., polymer, rubber, ceramic, etc.

Conventional gas distribution rings include a single ring positioned between gas inlet 120 and a high temperature region 122 (near cathode and anode) in which a plasma gas is converted to a plasma plume 150 (shown as plume exiting outlet 110 in FIG. 1) by application of an electrical current. Conventional gas distribution rings are typically made of a ceramic material such as alumina and include openings therein for allowing plasma gas to pass from gas inlet 120 therethrough to high temperature region 122. Typically, the gas distribution ring contacts the cathode or the anode. It has been discovered that as a conventional gas ring is subjected to the hot plasma gas flow, it eventually cracks under the high heat load. As the gas distribution ring cracks, the plasma gas flow is altered, which creates two distinct detrimental effects. The first effect is that the flow pattern can become disturbed when the ring is cracked through the area of the gas inlet openings, which affects the plasma and subsequent particle trajectory. This flow change can alter the deposition characteristics. The second detrimental effect is that the crack provides a radial path for the arc to flow, possibly creating an electrical short.

In contrast to conventional gas rings, gas distribution ring assembly 100 uses two parts: a gas distribution ring 142 and a separate positioning ring 144, that alleviate the effects of the gas ring cracking. As illustrated in FIG. 1, gas distribution ring assembly 100 (hereinafter "ring assembly 100") is positioned within an interior cavity 140 of plasma spray system 102 that communicates with gas inlet 120 and nozzle assembly 112, i.e., cathode 114 and anode 116. In particular, as illustrated for this specific plasma spray system, ring assembly 100 is positioned in an interior cavity 140 formed within, in part, insulator member 130, a metallic housing 132 and anode 116. Gas distribution ring 142 and positioning ring 144 may include any outer diameter flanges required for proper seating within cavity 140.

Figure 2:
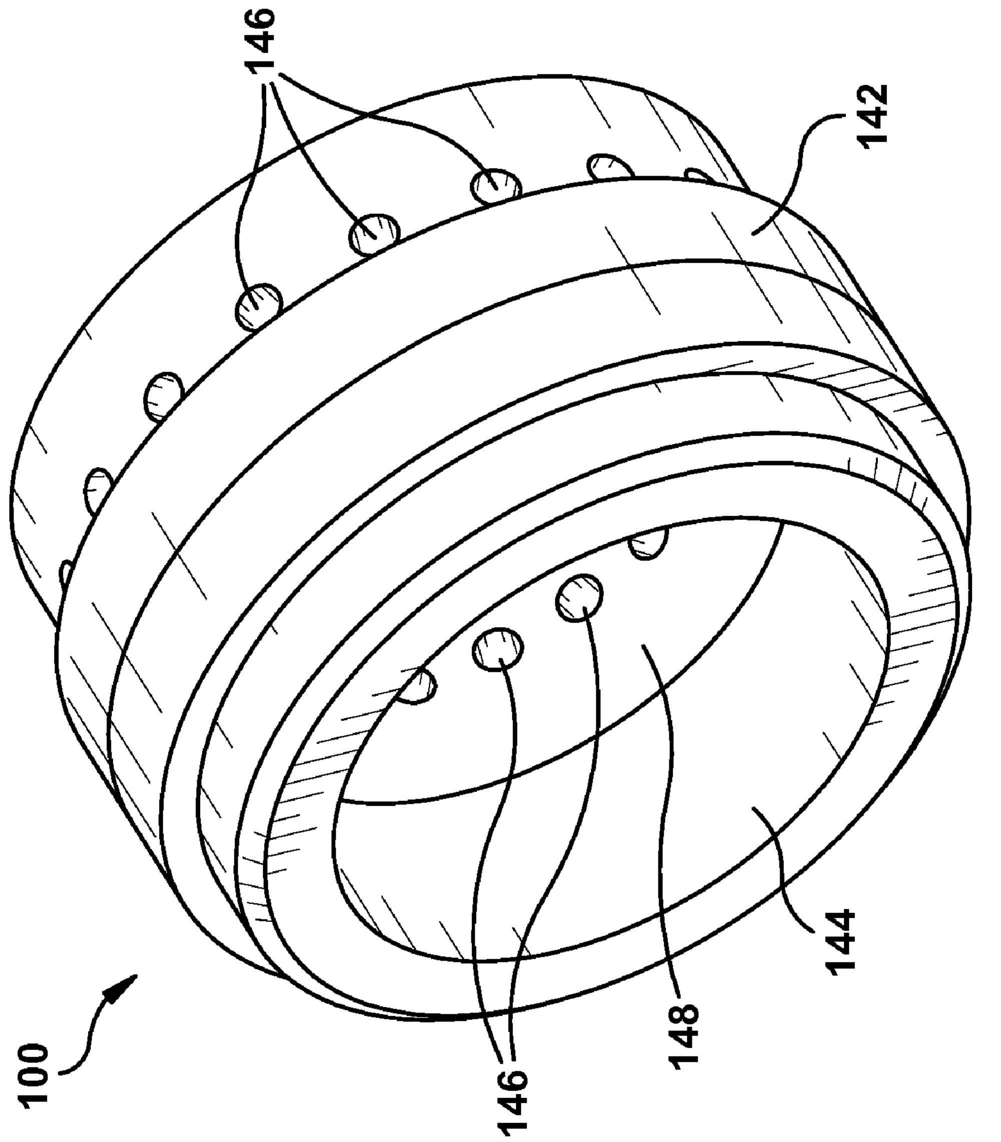
FIG. 2 shows a perspective view of one embodiment of the gas distribution ring assembly in an assembled configuration.
Figure 3:
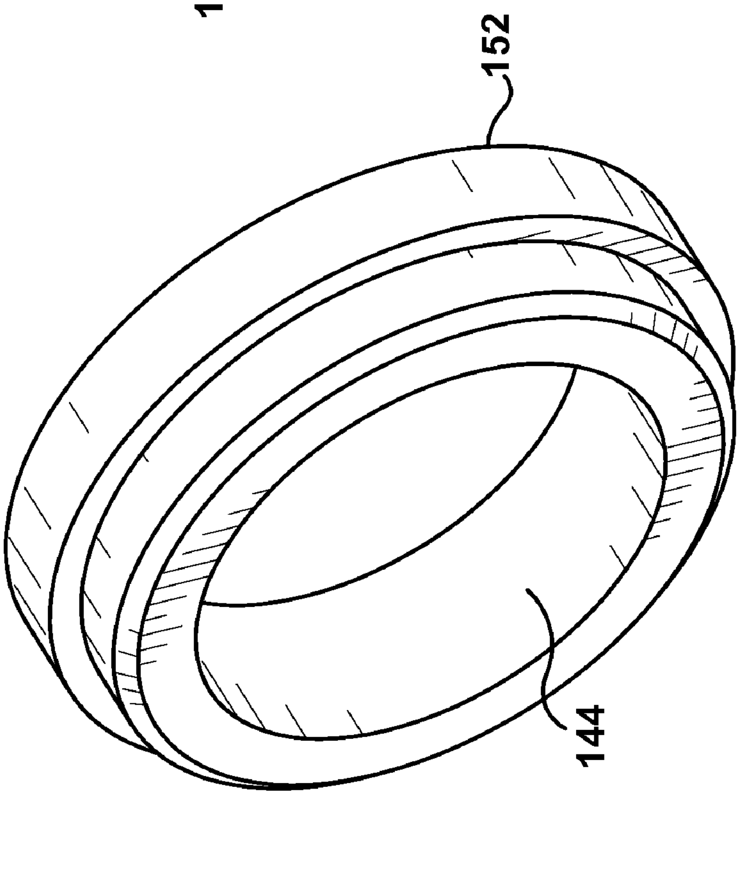
FIG. 3 shows a perspective view of one embodiment of a positioning ring of the gas distribution ring assembly.
Figure 4:
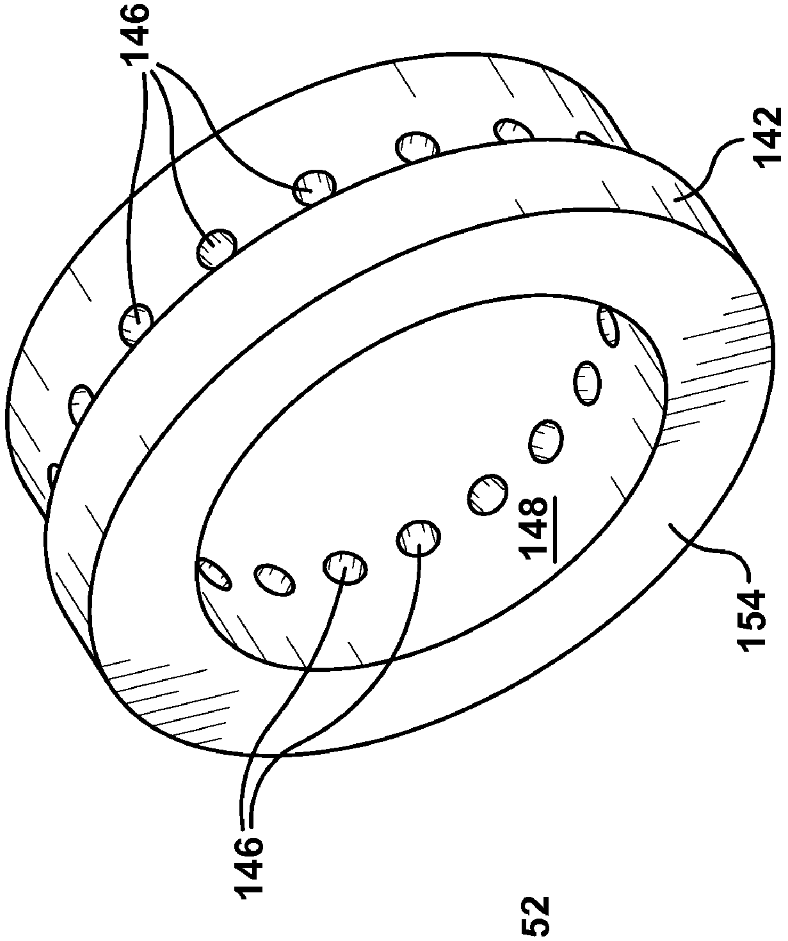
FIG. 4 shows a perspective view of one embodiment of a gas distribution ring of the gas distribution ring assembly.

As shown in one embodiment in FIGS. 2-4, ring assembly 100 includes gas distribution ring 142 for delivering a plasma gas to high temperature region 122. In this specific application, the plasma gas is delivered to nozzle assembly 112. In other cases, it may be simply delivered to cathode 114 and anode 116 for forming of plasma plume 150 (shown as a plume exiting outlet 110) that then enters a nozzle assembly. In this particular plasma spray system, plasma gas passes from gas inlet 120 through passages in insulator member 130 to an outer diameter of gas distribution ring 142. Gas distribution ring 142 includes a plurality of openings 146 allowing the gas to pass to an inner diameter 148 thereof. Openings 146 are configured in any now known or later developed fashion to provide uniform delivery of gas to inner diameter 148 for creation of plasma plume 150.

In contrast to conventional gas distribution rings, ring assembly 100 also includes separate positioning ring 144 axially aligned with gas distribution ring 142 between the gas distribution ring and outlet 110, and in particular in the illustrative embodiment, anode 116. As shown best in FIG. 3, positioning ring 144 includes an end face 152 that is positioned in contact with an end face 154 of gas distribution ring 142. In one embodiment, positioning ring 144 and gas distribution ring 142 each include a ceramic, each of which may be heat treated (e.g., in an approximately 1093° C. (2000° F.) vacuum furnace for approximately 2 hours) to release any residual stress from fabrication. In another embodiment, however, positioning ring 144 may include a ceramic, and gas distribution ring 142 may include a metal such as one of: copper alloy, iron alloy, nickel alloy, etc. In any event, positioning ring 144 also electrically insulates cathode 114 and gas distribution ring 142 from anode 116 and metallic housing 132.

Ring assembly 100 providing a separate positioning ring 144 and gas distribution ring 142 alleviates the problems caused by the cracking of a single gas distribution ring. In particular, any cracking occurs in positioning ring 144, which encounters high temperature region 122, rather than gas distribution ring 142, which is now distanced from region 122. That is, distancing gas distribution ring 142 from high temperature region 122 limits the temperature in the gas distribution zone while maintaining electrical insulation between cathode 114 and anode 116. Consequently, gas distribution ring 142 is not prone to cracking due to the reduction in temperature. Since gas distribution ring 142 does not crack, the flow pattern of plasma gas is not disturbed, and the plasma and subsequent particle trajectory will remain steady. Further, the risk of electrical shorting is removed.

Figure 5:
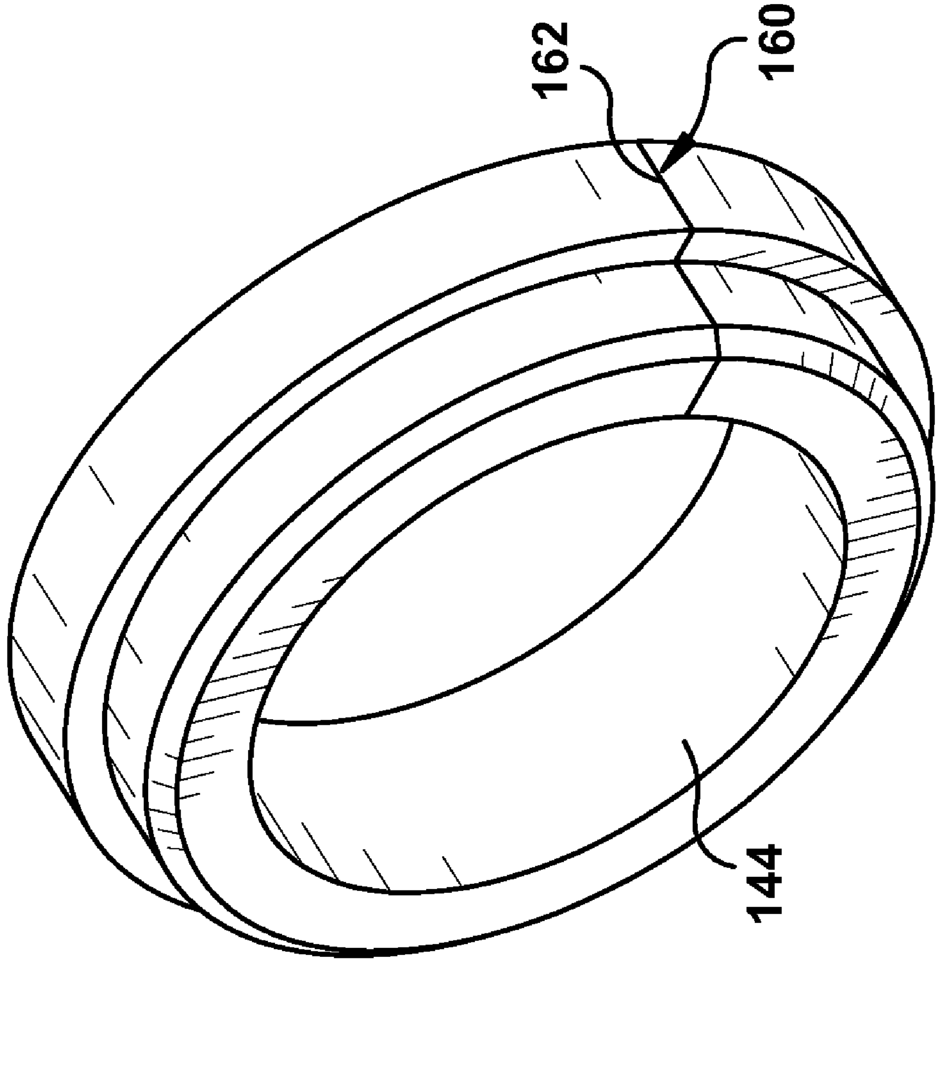
FIG. 5 shows a perspective view of another embodiment of the positioning ring.

Referring to FIGS. 5-9, a variety of different embodiments of positioning ring 144 are illustrated. In each of the embodiments, positioning ring 144 includes a discontinuity 160 that segments positioning ring 144 to provide for thermal expansion and contraction, reducing the chance of cracking due to thermally created stresses. Discontinuity 160 may take a variety of forms. In FIG. 5, discontinuity 160 includes a split 162 in ring 144. Although split 162 is illustrated as radially extending, that is not necessary, i.e., it may extend at an angle that is not radially aligned with a center of ring 144.

Figure 6:
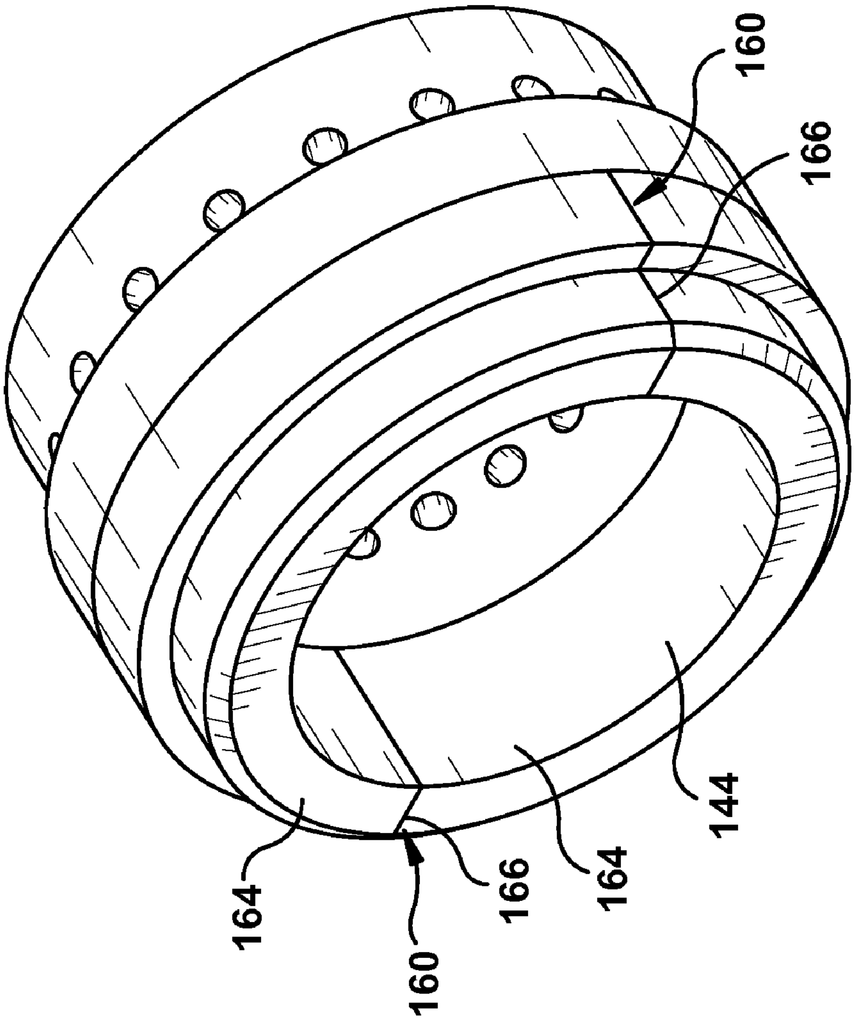
FIG. 6 shows a perspective view of yet another embodiment of the positioning ring in an assembled configuration with the gas distribution ring.
Figure 7:
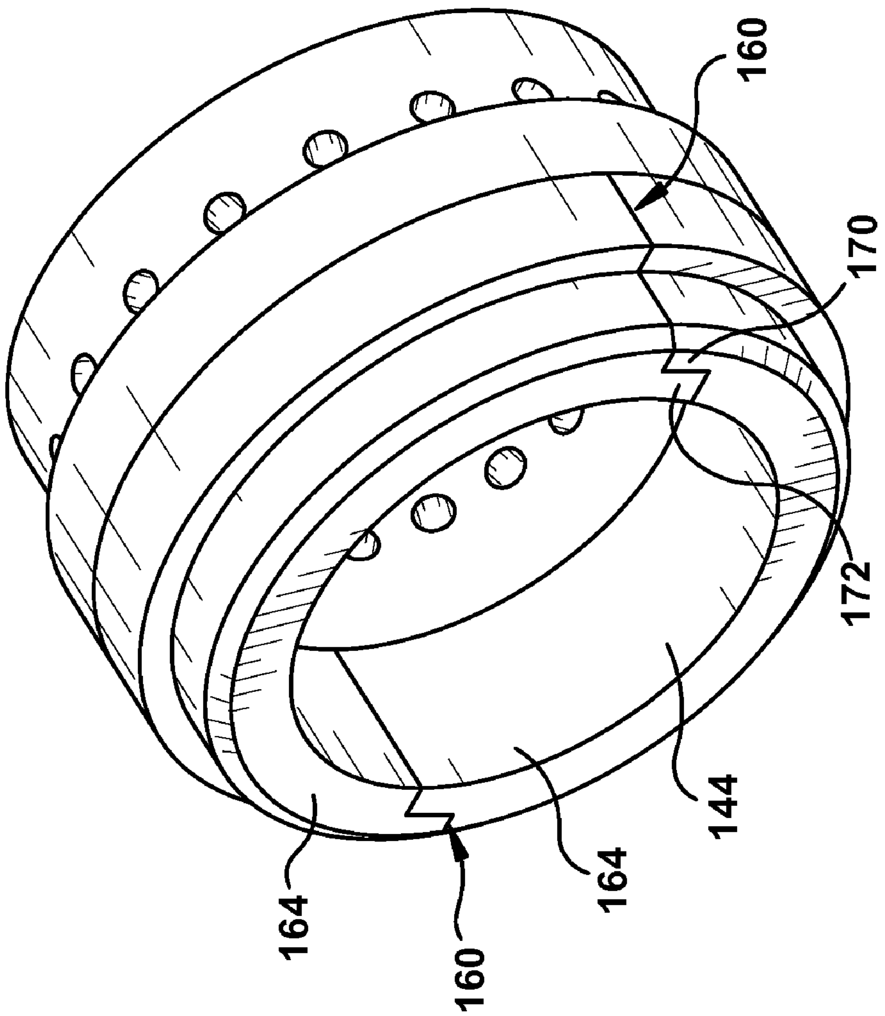
FIG. 7 shows a perspective view of another embodiment of the positioning ring in an assembled configuration with the gas distribution ring.
Figure 9:
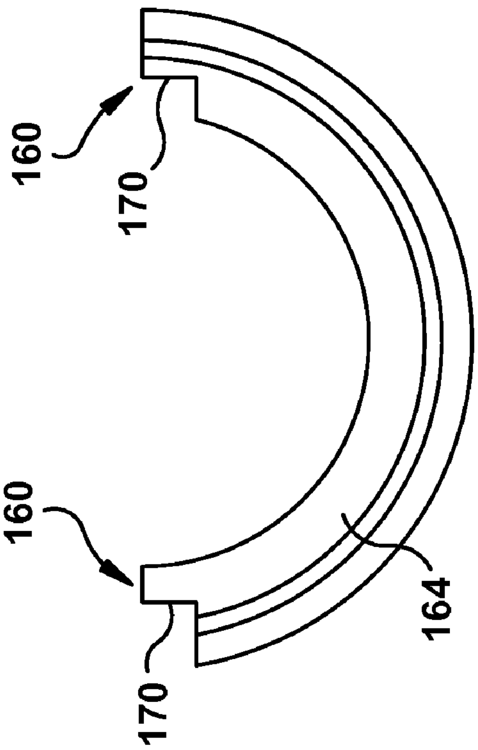
FIG. 9 shows a side view of the mating arcuate portion of the positioning ring of FIG. 8.
Figure 8:
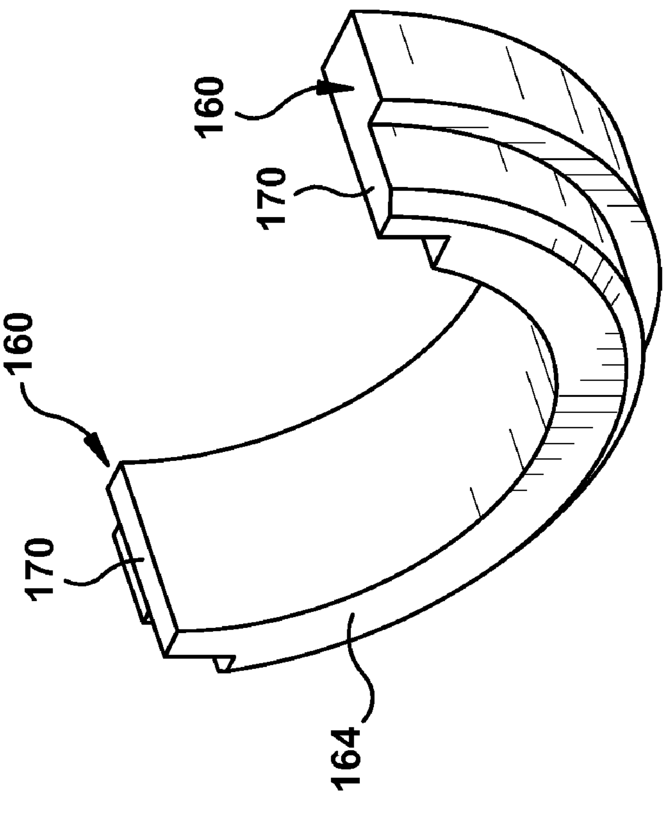
FIG. 8 shows a perspective view of one mating arcuate portion of the positioning ring of FIG. 7.

In FIGS. 6-9, positioning ring 144 includes at least a pair of arcuate portions 164 that mate to form the positioning ring, i.e., two discontinuities 160 are provided to segment the ring into arcuate portions. In FIG. 6, discontinuities 160 include splits 166. Although the splits 166 are illustrated as radially extending that is not necessary, i.e., they may extend at an angle that is not radially aligned with a center of ring 144. In addition, although shown as diametrically opposed so as to form a pair of semi-circular mating portions 164, splits 166 may be angled relative to one another in any fashion so as to create non-symmetrical arcuate portions. Furthermore, splits 166 in FIG. 6 are also shown as being planar, which is not necessary in all cases. For example, as shown in FIGS. 7-9, each arcuate mating portion 164 may include a seat 170 at an end thereof that complementarily mates to a seat 172 (FIG. 7 only) of an adjacent arcuate mating portion 164. In the examples shown in FIGS. 7-9, a stepped arrangement is provided; however, a variety of different arrangements are possible, e.g., mating curved surfaces, male-female mating surfaces or members, etc. The above-described aspects of positioning ring 144 may be combined in any fashion.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A gas distribution ring assembly for a plasma spray system, the ring assembly comprising:

a gas distribution ring including a plurality of openings allowing a gas to pass to an inner diameter thereof; and a separate positioning ring axially aligned with the gas distribution ring between the gas distribution ring and an electrically charged outlet of the plasma spray system, wherein the positioning ring includes at least a pair of arcuate portions that mate to form the positioning ring.

2. The ring assembly of claim 1, wherein the positioning ring includes an end face that is positioned in contact with an end face of the gas distribution ring.

3. The ring assembly of claim 1, wherein the positioning ring and the gas distribution ring each include a ceramic.

4. The ring assembly of claim 1, wherein the positioning ring includes a ceramic, and the gas distribution ring includes a metal.

5. The ring assembly of claim 4, wherein the metal is selected from the group consisting of: a copper alloy, an iron alloy and a nickel alloy.

6. The ring assembly of claim 1, wherein the positioning ring includes a pair of semi-circular mating portions.

7. The ring assembly of claim 1, wherein each arcuate mating portion includes a seat at an end thereof that complementarily mates to a seat of an adjacent arcuate mating portion.

8. The ring assembly of claim 1, wherein the positioning ring includes a discontinuity therein.

9. A plasma spray system comprising:

an outlet that includes a cathode and an anode;

an insulator member for electrically insulating the cathode from the anode;

a gas distribution ring assembly comprising:

a gas distribution ring for delivering a gas, the gas distribution ring including a plurality of openings allowing a gas to pass to an inner diameter thereof; and a separate positioning ring axially aligned with the gas distribution ring between the gas distribution ring and the outlet, wherein the positioning ring includes at least a pair of arcuate, mating portions; and a gas inlet for delivering the gas to the gas distribution ring.

10. The plasma spray system of claim 9, wherein the positioning ring includes an end face that is positioned in contact with an end face of the gas distribution ring.

11. The plasma spray system of claim 9, wherein the positioning ring and the gas distribution ring each include a ceramic.

12. The plasma spray system of claim 9, wherein the positioning ring includes a ceramic, and the gas distribution ring includes a metal.

13. The plasma spray system of claim 12, wherein the metal is selected from the group consisting of: a copper alloy, an iron alloy and a nickel alloy.

14. The plasma spray system of claim 9, wherein the positioning ring includes a pair of semi-circular mating portions.

15. The plasma spray system of claim 9, wherein each arcuate mating portion includes a seat at an end thereof that complementarily mates to a seat of an adjacent arcuate mating portion.

16. The plasma spray system of claim 9, wherein the positioning ring includes a discontinuity therein.

17. A plasma spray system comprising:

a nozzle assembly including a cathode and an anode;

a voltage generator including a first electrical input to the cathode and a second electrical input to the anode;

an insulator member electrically insulating the cathode from the anode;

a gas distribution ring assembly comprising:

a gas distribution ring for delivering a gas to the nozzle assembly, the gas distribution ring including a plurality of openings allowing a gas to pass to an inner diameter thereof; and a separate positioning ring axially aligned with the gas distribution ring between the gas distribution ring and the nozzle assembly, the positioning ring including an end face that is positioned in contact with an end face of the gas distribution ring, wherein the positioning ring includes at least a pair of arcuate, mating portions; and a source of gas coupled to a gas inlet for delivery of the gas to the gas distribution ring.

18. The plasma spray system of claim 17, wherein the positioning ring includes a discontinuity therein.

* * * * *